(12) United States Patent
Zhou et al.

(10) Patent No.: US 9,897,754 B2
(45) Date of Patent: Feb. 20, 2018

(54) WAVEGUIDE STRUCTURE AND PREPARATION METHOD

(71) Applicant: HUAWEI TECHNOLOGIES CO., LTD., Shenzhen (CN)

(72) Inventors: Libing Zhou, Leuven (BE); Weishi Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/485,634

(22) Filed: Apr. 12, 2017

(65) Prior Publication Data

US 2017/0299808 A1    Oct. 19, 2017

(30) Foreign Application Priority Data

Apr. 13, 2016    (CN) .......................... 2016 1 0230457

(51) Int. Cl.
| | |
|---|---|
| *G02B 6/122* | (2006.01) |
| *G02B 6/136* | (2006.01) |
| *G02B 6/12* | (2006.01) |
| *G02B 6/124* | (2006.01) |
| *G02B 6/02* | (2006.01) |

(52) U.S. Cl.
CPC ....... *G02B 6/1228* (2013.01); *G02B 6/12002* (2013.01); *G02B 6/122* (2013.01); *G02B 6/124* (2013.01); *G02B 6/12007* (2013.01); *G02B 6/136* (2013.01); *G02B 6/02085* (2013.01); *G02B 2006/12061* (2013.01)

(58) Field of Classification Search
CPC ............ G02B 6/02085; G02B 6/12002; G02B 6/12007; G02B 6/122; G02B 6/1228; G02B 6/124; G02B 6/136
USPC ...... 385/14, 27–28, 30, 37, 43, 49, 129–132
See application file for complete search history.

(56) References Cited

U.S. PATENT DOCUMENTS

| | | | | |
|---|---|---|---|---|
| 9,274,283 | B1 * | 3/2016 | Ellis-Monaghan | G02B 6/12002 |
| 9,417,388 | B2 * | 8/2016 | Yamasaki | ............ G02B 6/1228 |
| 2016/0291254 | A1 * | 10/2016 | Zhang | ...................... G02B 6/34 |

* cited by examiner

*Primary Examiner* — Akm Enayet Ullah
*Assistant Examiner* — Michael Mooney
(74) *Attorney, Agent, or Firm* — Staas & Halsey LLP

(57) ABSTRACT

A waveguide structure is provided. A silicon substrate layer, a silicon waveguide layer, a first silicon dioxide layer, a silicide waveguide layer, and a second silicon dioxide layer are stacked in sequence, the silicon waveguide layer is a conical waveguide layer, the silicon waveguide layer and the silicide waveguide layer are coupled by using an evanescent wave, the silicide waveguide layer includes multiple first waveguide blocks and multiple second waveguide blocks, a material of the first waveguide blocks is the same as a material of the silicide waveguide layer, and a refractive index of a material of the second waveguide blocks is lower than a refractive index of the material of the first waveguide blocks. By using the waveguide structure, a waveguide flare size can be increased, so as to match a mode size of a fiber core of an optical fiber.

10 Claims, 5 Drawing Sheets

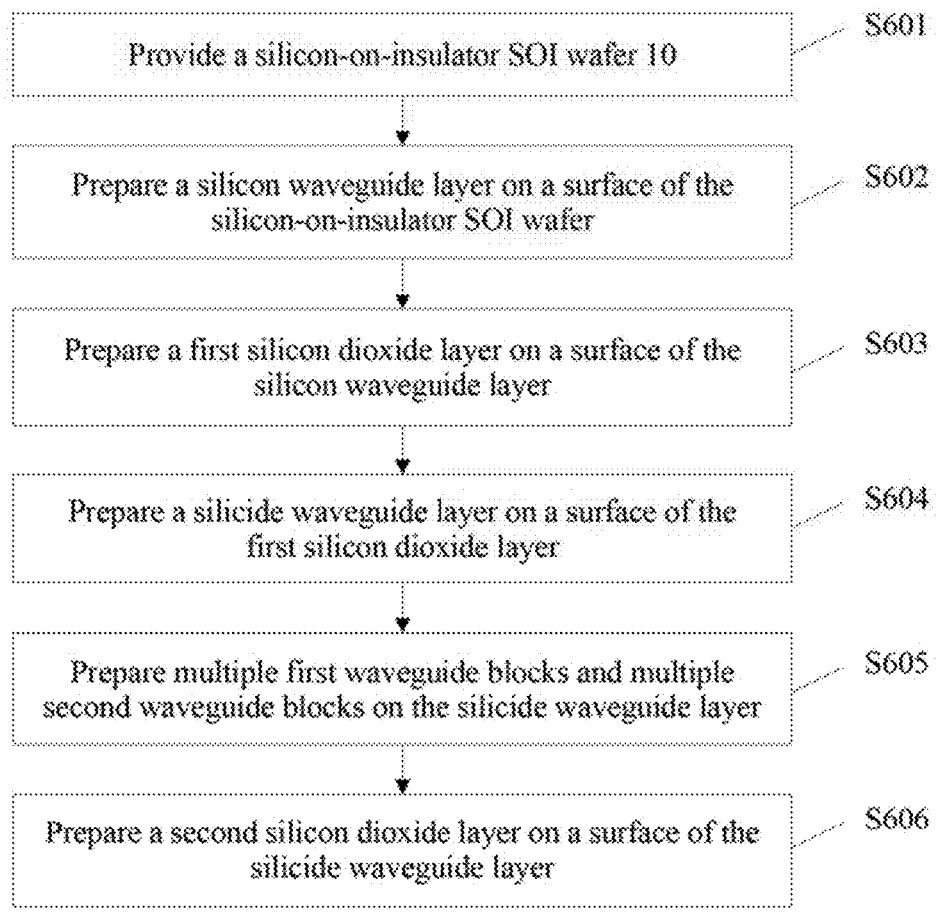
FIG. 6
FIG. 6.1

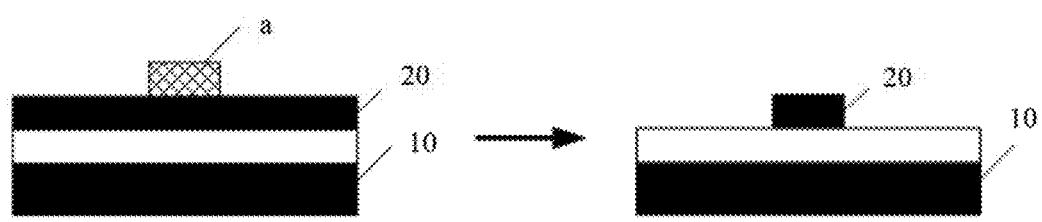
FIG. 6.2
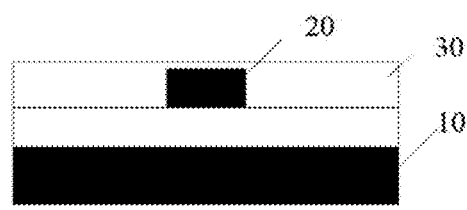
FIG. 6.3
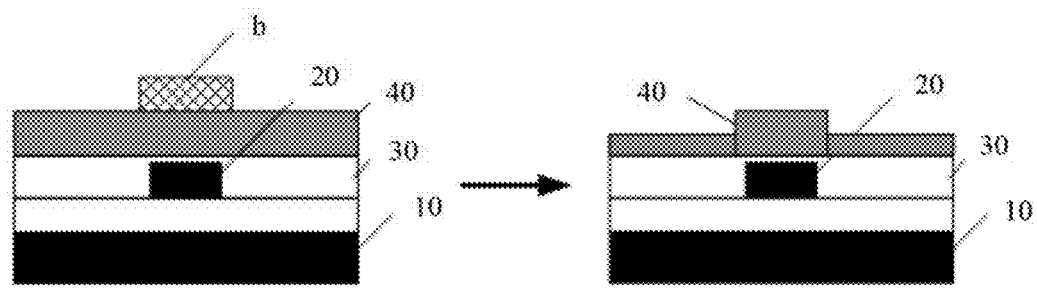
FIG. 6.4

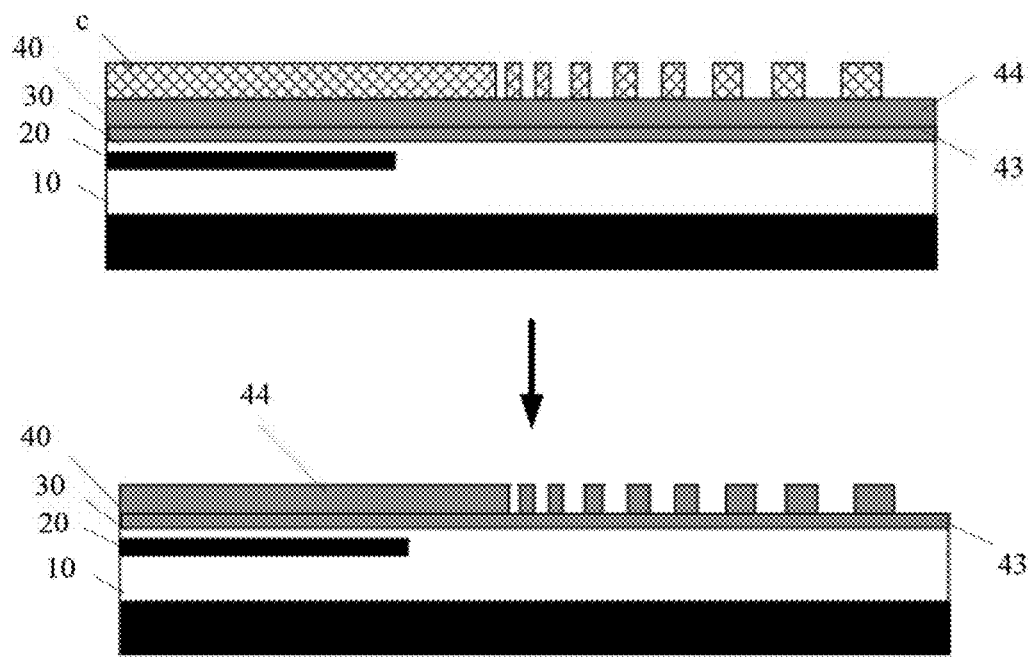
FIG. 6.5
FIG. 6.6

WAVEGUIDE STRUCTURE AND PREPARATION METHOD

CROSS-REFERENCE TO RELATED APPLICATION

This application claims priority to Chinese Patent Application No. 201610230457.0, filed on Apr. 13, 2016, which is hereby incorporated by reference in its entirety.

TECHNICAL FIELD

The present invention relates to the field of optical communications components, and in particular, to a waveguide structure and a preparation method.

BACKGROUND

With network product upgrading, a size and power consumption of a module used in a network are continuously decreasing, to meet requirements of continuous cost reduction and performance improvement. Because of its unique characteristics such as low costs, a subminiature size, and low power consumption, a silicon-based photonic component has attracted wide attention in the industry in recent years, and has become one of key trends under consideration for network product upgrading.

A flare size (0.3 um) of a silicon optical waveguide is far less than a mode size (9 um) of a fiber core of an optical fiber. Therefore, a coupling loss is relatively large because of a mismatch between sizes of optical coupling mode fields of the silicon photonic waveguide and the fiber core of the optical fiber. Currently, silicon-optical coupling solutions mainly include the following: One coupling solution is vertical coupling by using a grating coupler (grating coupler). In this solution, mode fields match. However, a loss of the grating coupler is relatively large, and the grating coupler is polarization-sensitive and wavelength-sensitive. Therefore, usage of this coupling solution is restricted. Another coupling solution is end face coupling. In this solution, a conical waveguide is used to implement flare size expansion. This structure has a high requirement on a technique of processing a cone tip structure. In addition, a flare size expansion effect is limited, and a flare size cannot match a mode size of an optical fiber.

SUMMARY

An objective of embodiments of the present invention is to provide a waveguide structure with low technical precision and a relatively large waveguide flare.

To achieve the foregoing objective, the embodiments of the present invention provide the following technical solutions:

According to a first aspect, an embodiment of the present invention provides a waveguide structure, including a silicon substrate layer, a silicon waveguide layer, a first silicon dioxide layer, a silicide waveguide layer, and a second silicon dioxide layer. The silicon substrate layer, the silicon waveguide layer, the first silicon dioxide layer, the silicide waveguide layer, and the second silicon dioxide layer are stacked in sequence, the silicon waveguide layer is a conical waveguide layer, and the silicon waveguide layer and the silicide waveguide layer are coupled by using an evanescent wave, so that an optical signal enters the silicide waveguide layer from the silicon waveguide layer through the evanescent wave. This can reduce a size-sensitivity requirement of a cone tip of a conical silicon waveguide, thereby simplifying a technique of the conical silicon waveguide and increasing technical tolerance. The silicide waveguide layer includes multiple first waveguide blocks and multiple second waveguide blocks, a material of the first waveguide blocks is the same as a material of the silicide waveguide layer, a refractive index of a material of the second waveguide blocks is lower than a refractive index of the material of the first waveguide blocks, and sizes of the multiple first waveguide blocks and the multiple second waveguide blocks increase gradually in a light output direction of the waveguide structure. This reduces an effective refractive index of the silicide waveguide layer and increases a waveguide flare size, so that the waveguide flare size matches a mode size of a fiber core of an optical fiber.

With reference to the first aspect of the embodiments of the present invention, in a first possible implementation manner of the first aspect, the silicide waveguide layer includes a first silicide waveguide layer and a second silicide waveguide layer that is disposed on the first silicide waveguide layer, where the second silicide waveguide layer is far away from the first silicon dioxide layer, and the second silicide waveguide layer is a strip waveguide layer or a conical waveguide layer. When the second silicide waveguide layer is a conical waveguide layer, an effective refractive index of a silicide waveguide can be further reduced, thereby further increasing the waveguide flare size.

With reference to the first possible implementation manner of the first aspect of the embodiments of the present invention, in a second possible implementation manner of the first aspect, the first waveguide blocks and the second waveguide blocks are disposed on the second silicide waveguide layer.

With reference to the first aspect of the embodiments of the present invention or the first or second possible implementation manner of the first aspect, in a third possible implementation manner of the first aspect, the material of the silicide waveguide layer is silicon oxycarbide or silicon carbide.

With reference to the first aspect of the embodiments of the present invention or the first, second, or third possible implementation manner of the first aspect, in a fourth possible implementation manner of the first aspect, the material of the second waveguide blocks is silicon dioxide or a polymer material.

With reference to the first aspect of the embodiments of the present invention or the first, second, third, or fourth possible implementation manner of the first aspect, in a fifth possible implementation manner of the first aspect, an interface of the first waveguide block and the second waveguide block is inclined, so that the interface and a light transmission direction are not perpendicular, reducing an interface return loss.

With reference to the first aspect of the embodiments of the present invention or the first, second, third, fourth, or fifth possible implementation manner of the first aspect, in a sixth possible implementation manner of the first aspect, a thickness of the silicon waveguide layer is 200 to 300 nm.

With reference to the first aspect of the embodiments of the present invention or the first, second, third, fourth, fifth, or sixth possible implementation manner of the first aspect, in a seventh possible implementation manner of the first aspect, if the material of the silicide waveguide layer is silicon oxycarbide, a thickness of the silicide waveguide layer is 2 to 3.5 um; or if the material of the silicide waveguide layer is silicon carbide, a thickness of the silicide waveguide layer is 300 to 600 nm.

According to a second aspect, an embodiment of the present invention provides a preparation method for preparing the waveguide structure according to the first aspect, including:

provinging a silicon-on-insulator wafer;

preparing a silicon waveguide layer on a surface of the silicon-on-insulator wafer;

preparing a first silicon dioxide layer on a surface of the silicon waveguide layer;

preparing a silicide waveguide layer on a surface of the first silicon dioxide layer;

preparing multiple first waveguide blocks and multiple second waveguide blocks on the silicide waveguide layer, and preparing a second silicon dioxide layer on a surface of the silicide waveguide layer.

With reference to the second aspect of the present invention, in a first possible implementation manner of the second aspect, a specific implementation manner of preparing multiple first waveguide blocks and multiple second waveguide blocks on the silicide waveguide layer is:

etching multiple etching grooves on the silicide waveguide layer; and filling, in the multiple etching grooves, a material whose refractive index is lower than a refractive index of a material of the silicide waveguide layer, so that the multiple first waveguide blocks and the multiple second waveguide blocks are formed on the silicide waveguide layer.

These aspects or another aspect of the present invention becomes simpler and more comprehensible in the following descriptions of embodiments.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 6 is a flowchart of preparing a waveguide structure according to the present invention; and FIG. 6.1 to FIG. 6.6 are schematic flowcharts of preparing a waveguide structure according to an embodiment of the present invention.

DESCRIPTION OF EMBODIMENTS

Figure 1:
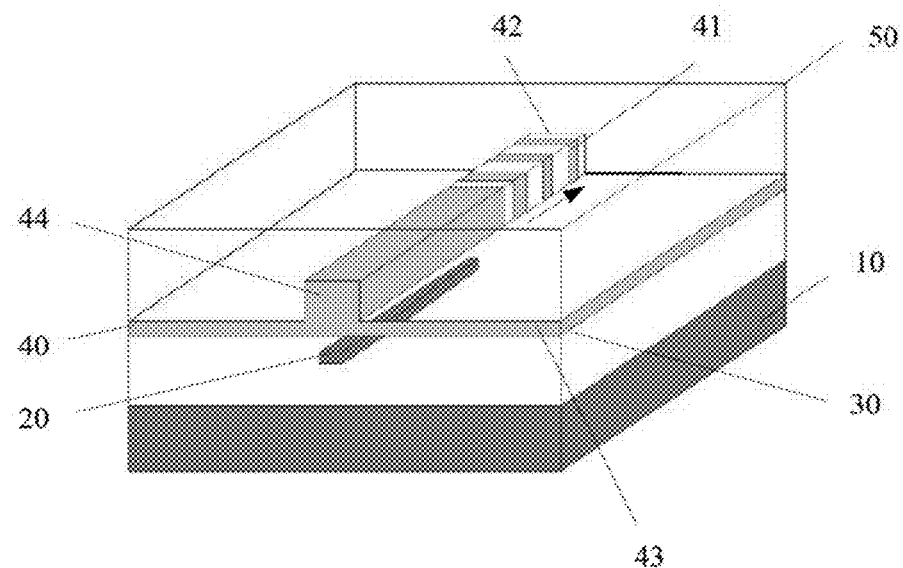
FIG. 1 is a schematic structural diagram of a waveguide coupling structure according to the present invention.
Figure 2:
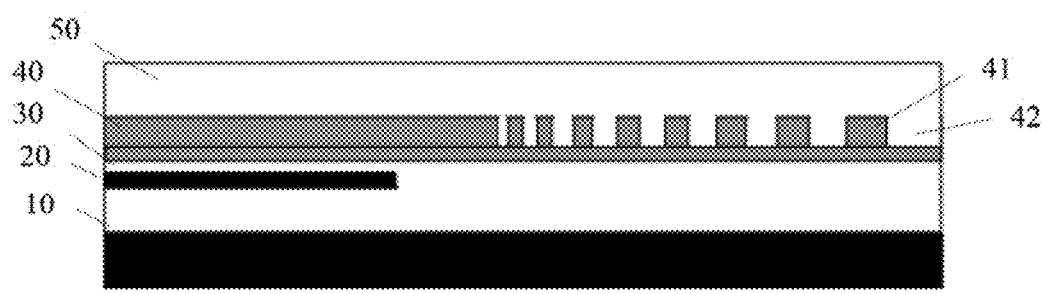
FIG. 2 is a side cross-sectional view of a waveguide structure according to the present invention.

To make the purpose, technical solutions, and advantages of the embodiments of the present invention clearer, the following clearly describes the technical solutions of the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Unless otherwise defined, a technical term or a scientific term used herein is corresponding to a general meaning understood by a person of ordinary skill in the art of the present invention. "First", "second". "third", "fourth", and the like used in the present invention are used to differentiate between different objects rather than describing a specific sequence, a specific quantity, or specific importance. Similarly, "one", "a", or "the" or a similar expression also does not represent quantity restriction, but is only used to represent that at least one exists. "Including" or "comprising" or a similar expression indicates that an element or an article appearing before the expression covers an element or an article enumerated after the word and an equivalent thereof, without excluding another element or article. A "connection" or a link or a similar expression is not restricted to a physical or mechanical connection, but may include an electrical connection, whether it is a direct connection or an indirect connection. "On", "below", "left", "right", or the like is only used to represent a relative position relationship. When an absolute position of a described object is changed, the relative position relationship may also change correspondingly.

"On" and "below" in the embodiments of the present invention are subject to a sequence of preparing film layers. For example, an upper film or pattern refers to a later formed film or pattern, and a lower film or pattern refers to an earlier formed film or pattern. For the sake of clarity, a thickness of a layer or a region in an accompanying drawing is amplified, and is not drawn according to an actual ratio. When an element such as a layer, a film, a region, or a substrate is referred to as being located "on" another element, the element may be "directly" located "on" the another element, or there may be an intermediate element.

An "embodiment" mentioned in this application means that a specific feature, structure, or characteristic described with reference to the embodiment may be included in at least one embodiment of the present invention. The phase occurred at different locations in the specification does not necessarily refer to a same embodiment, or an independent or alternate embodiment exclusive of another embodiment. A person skilled in the art understands, in explicit and implicit manners, that an embodiment described in this application may be combined with another embodiment.

Refer to FIG. 1 to FIG. 5. FIG. 1 shows a waveguide structure 100 according to an embodiment of the present invention, including a silicon substrate layer 10, a silicon waveguide layer 20, a first silicon dioxide layer 30, a silicide waveguide layer 40, and a second silicon dioxide layer 50. The silicon substrate layer 10, the silicon waveguide layer 20, the first silicon dioxide layer 30, the silicide waveguide layer 40, and the second silicon dioxide layer 50 are stacked in sequence. The silicon waveguide layer 20 is a conical waveguide layer. The silicon waveguide layer 20 and the silicide waveguide layer 40 are coupled by using an evanescent wave. The silicide waveguide layer 40 includes multiple first waveguide blocks 41 and multiple second waveguide blocks 42. A material of the first waveguide blocks 41 is the same as a material of the silicide waveguide layer 40. A refractive index of a material of the second waveguide blocks 42 is lower than a refractive index of the material of the first waveguide blocks 41. Sizes of the multiple first waveguide blocks 41 and the multiple second waveguide blocks 42 increase gradually in a light output direction (direction indicated by an arrow in FIG. 1) of the waveguide structure. An optical signal enters the silicide waveguide layer 40 from the silicon waveguide layer 20 through an evanescent wave. It should be noted that, in the waveguide structure 100 shown in FIG. 1, in order that each component in the structure can be clearly seen, transparency treatment is performed on some components (for example, the first silicon dioxide layer 30 and the second silicon dioxide layer 50) in the waveguide structure 100.

An evanescent wave refers to a type of electromagnetic wave generated on an interface of two different media due to total reflection, and is also referred to as a fade-out wave. An amplitude of the evanescent wave decays exponentially as a depth perpendicular to the interface increases. Coupling by using an evanescent wave refers to a manner in which photon energy enters a waveguide from another waveguide through the evanescent wave. The silicon waveguide layer 20 and the silicide waveguide layer 40 are coupled by using an evanescent wave, so that an optical signal enters the silicide waveguide layer 40 from the silicon waveguide layer 20 through the evanescent wave. A refractive index of silicide is lower than a refractive index of silicon. Therefore, to achieve flare size expansion equivalent to flare size expansion implemented by a conical silicon waveguide, the silicide waveguide layer 40 is of a larger size (that is, a minimum size of the silicide waveguide layer 40 is greater than a minimum size of the conical silicon waveguide). This can reduce a size-sensitivity requirement of a cone tip of the conical silicon waveguide, thereby simplifying a technique of the conical silicon waveguide and increasing technical tolerance. In addition, segment etching is performed on the silicide waveguide layer 40. Then, when cladding and filling techniques are used in applying a material whose refractive index is lower than a refractive index of the material of the silicide waveguide layer, the material is filled in a segment gap of a silicide waveguide. In this way, an effective refractive index of the silicide waveguide is further reduced, thereby expanding a flare size.

Figure 4:
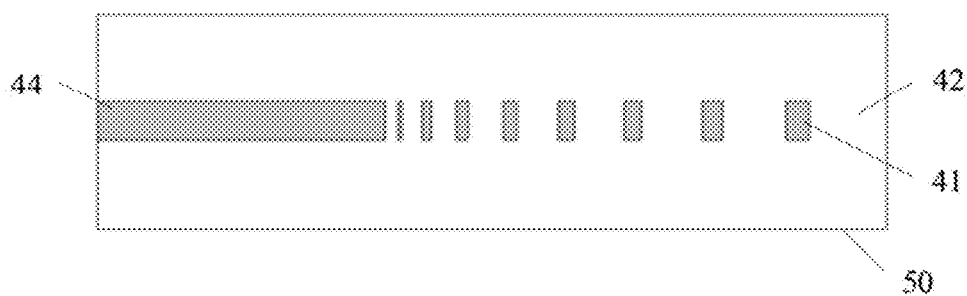
FIG. 4 is a top cross-sectional view of a waveguide structure according to the present invention.
Figure 5:
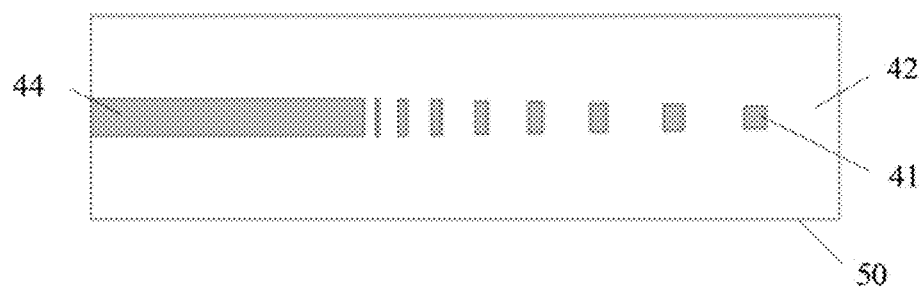
FIG. 5 is another top cross-sectional view of a waveguide structure according to the present invention.

Optionally, as shown in FIG. 1, the silicide waveguide layer 40 includes a first silicide waveguide layer 43 and a second silicide waveguide layer 44 that is disposed on the first silicide waveguide layer 43. The second silicide waveguide layer 44 is far away from the first silicon dioxide layer 30, and the second silicide waveguide layer 44 is a strip waveguide layer (as shown in FIG. 4) or a conical waveguide layer (as shown in FIG. 5). When the second silicide waveguide layer 44 is of a conical shape, an effective refractive index of a silicide waveguide can be further reduced, thereby further increasing a waveguide flare size.

Optionally, the first waveguide blocks 41 and the second waveguide blocks 42 are disposed on the second silicide waveguide layer 44.

Optionally, the material of the silicide waveguide layer 40 is silicon oxycarbide or silicon carbide.

Optionally, the material of the second waveguide blocks 42 is silicon dioxide or a polymer material. The polymer material refers to a compound that is of a high molecular weight (which generally may reach 10 to 106) and that is formed by repeatedly connecting many identical and simple constitutional units by using a covalent bond. The polymer material is a high molecular material with good light transmission on a near-infrared (1250 nm to 1650 nm) communications waveguide, for example, PMMA (polymethyl methacrylate). A refractive index of the polymer material is 1.40 to 1.55.

Figure 3:
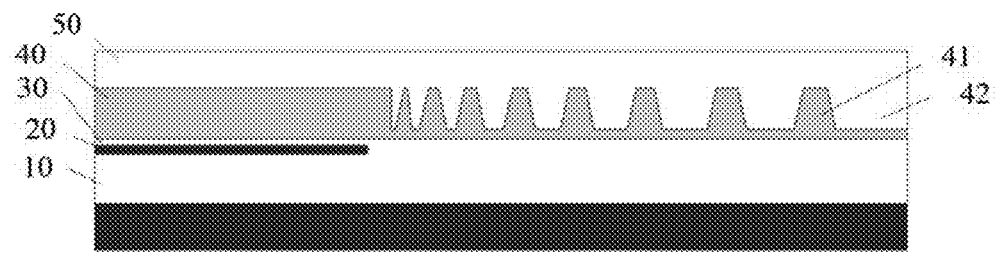
FIG. 3 is another side cross-sectional view of a waveguide structure according to the present invention.

Optionally, an interface of the first waveguide block 41 and the second waveguide block 42 is inclined. As shown in FIG. 3, to reduce interface reflection between the first waveguide block 41 and the second waveguide block 42, the interface between the first waveguide block 41 and the second waveguide block 42 is designed to be in a shape of an oblique angle, so that the interface and a light transmission direction are not perpendicular, thereby reducing an interface return loss.

Optionally, a thickness of the silicon waveguide layer 20 is 200 to 300) nm.

Optionally, if the material of the silicide waveguide layer 40 is silicon oxycarbide, a thickness of the silicide waveguide layer is 2 to 3.5 um. If the material of the silicide waveguide layer 40 is silicon carbide, a thickness of the silicide waveguide layer is 300) to 600 nm.

It can be learned that, in the waveguide structure provided in the present invention, a silicon waveguide layer and a silicide waveguide layer are coupled by using an evanescent wave, so that an optical signal enters the silicide waveguide layer from the silicon waveguide layer through the evanescent wave. This can reduce a size-sensitivity requirement of a top part of a conical silicon waveguide, thereby simplifying a technique of the conical silicon waveguide and increasing technical tolerance. The silicide waveguide layer includes multiple first waveguide blocks and multiple second waveguide blocks. A material of the first waveguide blocks is the same as a material of the silicide waveguide layer. A refractive index of a material of the second waveguide blocks is lower than a refractive index of the material of the first waveguide blocks, and sizes of the multiple first waveguide blocks and the multiple second waveguide blocks increase gradually in a light output direction of the waveguide structure. This reduces an effective refractive index of the silicide waveguide layer and enlarges a flare, so that a waveguide flare size matches a mode size of a fiber core of an optical fiber.

Referring to FIG. 6, FIG. 6 is a flowchart of preparing a waveguide structure according to an example implementation manner of the present invention. It can be understood that, some steps in this embodiment may also be omitted, and another step may also be added. It can be understood that, in another implementation manner, the following multiple steps may be combined into one step, or one step may be split into multiple steps, and a sequence between steps may be adjusted as required. A procedure of preparing the waveguide structure includes the following steps.

S601. Provide a silicon-on-insulator SOI wafer 10. As shown in FIG. 6.1, the SOI wafer 10 is a common SOI wafer, and a structure is that a silicon dioxide layer is disposed between two silicon layers.

S602. Prepare a silicon waveguide layer on a surface of the silicon-on-insulator SOI wafer.

Specifically, as shown in FIG. 6.2, a specific implementation manner of preparing a silicon waveguide layer on a surface of the silicon-on-insulator SOI wafer is: depositing a silicon material on the surface of the SOI silicon wafer by using a low-pressure chemical vapor deposition (LPCVD) technology, to form a silicon film layer; disposing a hard mask a in a middle part on a surface of the silicon film layer (where the hard mask a may be photoresist or a hard mask combination of oxide-nitride-oxide (ONO)); and etching on the silicon film layer on which the hard mask a is disposed in the middle part on the surface, to form a silicon waveguide layer 20. The hard mask a can protect a region under a surface that is covered by the hard mask a and that is of the silicon film layer from being etched away. Therefore, when etching is performed on the surface, of the silicon film layer, on which the hard mask a is disposed, the region under the surface that is covered by the hard mask a and that is of the silicon film layer is not etched away, and a region under a surface that is not covered by the hard mask a and that is of the silicon film layer is gradually etched away due to a lack of protection, so that the silicon waveguide layer 20 is formed on the surface of the silicon-on-insulator SOI wafer 10.

The silicon waveguide layer 20 may be prepared by means of dry etching. Alternatively, in another implementation manner, the silicon waveguide layer 20 may be prepared by using another method, for example, by means of wet etching. Dry etching in the following steps may be replaced by wet etching.

S603. Prepare a first silicon dioxide layer on a surface of the silicon waveguide layer. As shown in FIG. 6.3, a layer of silicon dioxide is deposited on the silicon waveguide layer 20 by using the LPCVD technology, and a first silicon dioxide layer 30 is obtained by rubbing down the layer of silicon dioxide.

S604. Prepare a silicide waveguide layer on a surface of the first silicon dioxide layer.

Specifically, as shown in FIG. 6.4, a specific implementation manner of preparing a silicide waveguide layer on a surface of the first silicon dioxide layer is: depositing a silicide material on the surface of the first silicon dioxide layer 30 by using the LPCVD technology, to form a silicide film layer, where the silicide material may be silicon oxycarbide or silicon carbide; disposing a hard mask b in a middle part on a surface of the silicide film layer (where the hard mask b may be photoresist or a hard mask combination of oxide-nitride-oxide (ONO)); and etching on the silicide film layer on which the hard mask b is disposed in the middle part on the surface, to form the silicide waveguide layer 40. The hard mask b can protect a region under a surface that is covered by the hard mask b and that is of the silicon film layer from being etched away. Therefore, when etching is performed on the surface, of the silicide film layer, on which the hard mask b is disposed, the region under the surface that is covered by the hard mask b and that is of the silicide film layer is not etched away, and a region under a surface that is not covered by the hard mask b and that is of the silicide film layer is gradually etched away due to a lack of protection, so that the silicide waveguide layer 40 is formed on the surface of the first silicon dioxide layer.

S605. Prepare multiple first waveguide blocks and multiple second waveguide blocks on the silicide waveguide layer.

In this embodiment of the present invention, a specific implementation manner of preparing multiple first waveguide blocks and multiple second waveguide blocks on the silicide waveguide layer is: etching multiple etching grooves on the silicide waveguide layer; and filling, in the multiple etching grooves, a material whose refractive index is lower than a refractive index of a material of the silicide waveguide layer, so that multiple first waveguide blocks 41 and multiple second waveguide blocks 42 are formed on the silicide waveguide layer.

Specifically, as shown in FIG. 6.5, the silicide waveguide layer 40 includes a first silicide waveguide layer 43 and a second silicide waveguide layer 44. Multiple hard masks c are disposed on a surface of the first silicide waveguide layer 43 and the second silicide waveguide layer 44 (where the hard mask c may be photoresist or a hard mask combination of oxide-nitride-oxide (ONO)); and etching is performed on the silicide waveguide layer 40 on a surface of which the hard masks c are disposed, to form multiple etching grooves. The hard masks c can protect a region under a surface that is covered by the hard masks c and that is of the silicide waveguide layer 40 from being etched away. Therefore, when etching is performed on the surface, of the silicide waveguide layer 40, on which the hard masks c are disposed, the region under the surface that is covered by the hard masks c and that is of the silicide waveguide layer 40 is not etched away, and a region under a surface that is not covered by the hard masks c and that is of the silicide waveguide layer 40 is gradually etched away due to a lack of protection, so that the multiple etching grooves are formed on the surface of the silicide waveguide layer 40. Then, the material whose refractive index is lower than the refractive index of the material of the silicide waveguide layer is filled in the multiple etching grooves, so that the multiple first waveguide blocks 41 and the multiple second waveguide blocks 42 are formed on the silicide waveguide layer 40. As shown in FIG. 6.6, the material is, for example, silicon dioxide or polymer.

S606. Prepare a second silicon dioxide layer on a surface of the silicide waveguide layer.

Specifically, if the material filled in the etching grooves in the foregoing step S605 is silicon dioxide, the second silicon dioxide layer is prepared when step S605 is completed. If the material filled in the etching grooves in the foregoing step S605 is a polymer material, a layer of silicon dioxide needs to be deposited on the silicide waveguide layer 40 by using the LPCVD technology, and a second silicon dioxide layer 50 is obtained by rubbing down the layer of silicon dioxide.

The foregoing implementation manners are not intended to limit the protection scope of the technical solutions. Any modification, equivalent replacement, and improvement made without departing from the spirit and principle of the foregoing implementation manners shall fall within the protection scope of the technical solutions.

What is claimed is:

1. A waveguide structure, comprising:
a silicon substrate layer, a silicon waveguide layer, a first silicon dioxide layer, a silicide waveguide layer, and a second silicon dioxide layer, wherein the silicon substrate layer, the silicon waveguide layer, the first silicon dioxide layer, the silicide waveguide layer, and the second silicon dioxide layer are stacked in sequence, the silicon waveguide layer is a conical waveguide layer, the silicon waveguide layer and the silicide waveguide layer are coupled by using an evanescent wave, the silicide waveguide layer comprises multiple first waveguide blocks and multiple second waveguide blocks, a material of the first waveguide blocks is the same as a material of the silicide waveguide layer, a refractive index of a material of the second waveguide blocks is lower than a refractive index of the material of the first waveguide blocks, and sizes of the multiple first waveguide blocks and the multiple second waveguide blocks increase gradually in a light output direction of the waveguide structure.

2. The waveguide structure according to claim 1, wherein the silicide waveguide layer comprises a first silicide waveguide layer and a second silicide waveguide layer that is disposed on the first silicide waveguide layer.

3. The waveguide structure according to claim 2, wherein the first waveguide blocks and the second waveguide blocks are disposed on the second silicide waveguide layer.

4. The waveguide structure according to claim 2, wherein the material of the silicide waveguide layer is silicon oxycarbide or silicon carbide.

5. The waveguide structure according to claim 1, wherein the material of the second waveguide blocks is silicon dioxide or a polymer material.

6. The waveguide structure according to claim 1, wherein an interface of the first waveguide block and the second waveguide block is inclined.

7. The waveguide structure according to claim 2, wherein a thickness of the silicon waveguide layer is 200 to 300 nm.

8. The waveguide structure according to claim 2, wherein if the material of the silicide waveguide layer is silicon oxycarbide, a thickness of the silicide waveguide layer is 2 to 3.5 um; or if the material of the silicide waveguide layer is silicon carbide, a thickness of the silicide waveguide layer is 300 to 600 nm.

9. A preparation method for preparing a waveguide structure, comprising:
   providing a silicon-on-insulator wafer;
   preparing a silicon waveguide layer on a surface of the silicon-on-insulator wafer;
   preparing a first silicon dioxide layer on a surface of the silicon waveguide layer;
   preparing a silicide waveguide layer on a surface of the first silicon dioxide layer;
   preparing multiple first waveguide blocks and multiple second waveguide blocks on the silicide waveguide layer; and
   preparing a second silicon dioxide layer on a surface of the silicide waveguide layer.

10. The method according to claim 9, wherein the preparing multiple first waveguide blocks and multiple second waveguide blocks on the silicide waveguide layer comprises:
   etching multiple etching grooves on the silicide waveguide layer; and
   filling, in the multiple etching grooves, a material whose refractive index is lower than a refractive index of a material of the silicide waveguide layer, so that the multiple first waveguide blocks and the multiple second waveguide blocks are formed on the silicide waveguide layer.

* * * * *